United States Patent Office 3,494,930
Patented Feb. 10, 1970

3,494,930
FREE RADICALS OF THE NITROXIDE TYPE
Rose Marie Dupeyre and André Rassat, Grenoble, France, assignors to Commissariat a l'Energie Atomique, Paris, France
No Drawing. Filed June 27, 1967, Ser. No. 649,121
Claims priority, application France, July 14, 1966, 68,112
Int. Cl. C07d 29/16, 29/20
U.S. Cl. 260—294.7       1 Claim

ABSTRACT OF THE DISCLOSURE

Novel free radicals of the nitroxide type for use as initiators of radical reactions, collectors of free radicals, polymerization inhibitors or anti-oxidants are constituted by nitrogenous bicyclic compounds in which one of the bridges comprises solely the nitroxide radical group and, in particular, by aza-9-bicyclo (3,3,1) nonanone-3-oxyl-9, and by aza-9-bicyclo (3,3,1) nonane oxyl-9.

---

This invention relates to novel free radicals of the nitroxide type which are characterized by good stability in spite of high chemical reactivity.

The free radicals in accordance with the invention can be employed especially as initiators of radical reactions, as collectors of free radicals, as polymerization inhibitors, or as anti-oxidants.

The free radicals under consideration are nitrogenous bicyclic compounds in which one of the bridges is constituted solely by the nitroxide radical group.

The stability of these compounds is comparable with that of the free radicals which were disclosed in French Patent No. 1,376,691. Whereas the stability of the radicals described in the patent cited were attributable to the presence of two quatenary carbon atoms which form a direct link with the nitrogen atom, the stability referred to is due in accordance with the present invention to the bicyclic system.

By way of non-limitative example, there will now be described the preparation of two radicals which correspond to the definition given above and having the formula:

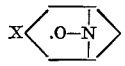

wherein $X=CH_2$ and $X=CO$.

The preparation of aza-9 bicyclo (3,3,1) nonanone-3 oxyl-9 (compound III) can be shown diagrammatically by the following reactions:

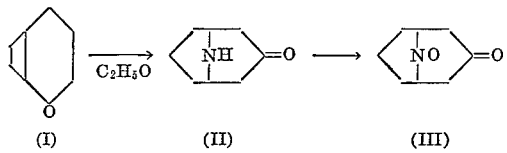

In an Erlenmeyer flask, there were placed 13.2 ml. of concentrated hydrochloric acid, 99 ml. of distilled water and 38.2 g. of ethoxy-2 dihydro-3, 4 2H pyran (0.3 mole of compound I). The mixture was subjected to powerful agitation for a period of 20 minutes and then allowed to stand for a period of one hour.

There was then added to the colorless solution in the following order: 168 ml. of distilled water, 24 g. of ammonium chloride (0.45 mole) which was dissolved in 240 ml. of water, 50 g. of dicarboxylic acid acetone (0.3 mole) which was dissolved in 500 ml. of distilled water and a solution of 53 g. of acid phosphate of hydrated sodium, and 4.3 g. of soda in pellet form dissolved in 200 ml. of distilled water in the hot state. The yellow solution became rapidly turbid and an evolution of gas was noted. The pH of the solution which was initially 2.5 increased to approximately 4 after agitation for 17 hours. There were then added 20 ml. of concentrated hydrochloric acid and heating was then carried out in a water bath until complete decarboxylation. There were then added to the cooled solution 45 g. of soda in pellet in 60 ml. of distilled water. The basic mixture was extracted by 8 portions of 200 ml. of methylene chloride. The solution of methylene chloride was dried on anhydrous sodium sulphate, concentrated to approximately 100 ml., then filtered rapidly through 240 g. of alumina. Elution was carried out with methylene chloride until 450 ml. of solvent were obtained.

After concentration, 40 g. of a viscous brown product were obtained. The nor-pseudo-pelletierine (compound II) was separated from this product in the form of picrate. There were obtained 15 g. of yellow needles which had a melting point of 216° C. (in vacuo).

Using the chromatographic method, 5.3 g. of picrate were passed through 500 g. of alumina, there being eluted with the mixture 95% methylene chloride, 5% methanol, 1.75 g. of nor-pseudo-pelletierine, namely a yield of 87%. This product melted at 123–125° C. and had an infrared spectrum which was mainly characterized by the presence of a band C=O at 1705 cm.$^{-1}$.

To 1.5 g. of compound II which were dissolved in 15 ml. of distilled water, there were added approximately 10 mg. of phosphotungstic acid and 1.8 ml. of hydrogen peroxide at 110 volumes. After agitation for a period of two hours, the solution was saturated with sodium chloride, then extracted by 3 portions of 50 ml. of ethyl ether. The ethereal solution was washed with a saturated sodium chloride solution, then dried on anhydrous sodium sulphate. After evaporation of the ether, there were then obtained 900 mg. of yellow crystals (mixture of II and III) which were separated by chromatography on 120 g. of "Woehler" alumina having an activity of 3. Elution with benzene resulted in the separation of 320 mg. of yellow powder corresponding to compound III. After recrystallization in ethyl ether, there were obtained 308 mg. of compound III, thus constituting a yield of 30%. The product appeared in the form of yellow needles having a melting point of 120–121° C.

The infrared spectrum in the carbon tetrachloride is mainly characterized by the presence of a band C=O at 1715 cm.$^{-1}$ and a band N—O at 1300 cm.$^{-1}$ which does not exist in the amine spectrum. The ultraviolet spectrum in chloroform shows the characteristic absorption of the nitroxide radicals at $\lambda_{max.}=462$ m$\mu$ (coefficient of specific absorption $\epsilon$ equal to 8.5).

The second example of preparation of a free radical in accordance with the invention relates to the preparation of aza-9 bicyclo (3,3,1) nonane oxyl-9 (compound V). This latter can be represented schematically by the following reactions:

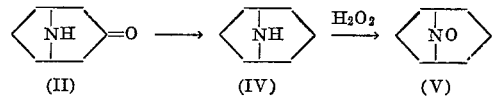

To a solution of 2 g. of amine (II) in 20 ml. of diethylene glycol, there were added 2 g. of freshly distilled hydrazine.

The mixture was refluxed for a period of 3 hours. After cooling, 4 g. of potassium in pellet form were added and the water formed was distilled. Refluxing was then allowed to proceed for a period of two hours. After cooling of the solution, distilled water was then added followed by vapor entrainment. The aqueous solution obtained was extracted by 3 portions of 100 cc. of ethyl ether which was washed with a saturated sodium chloride solution and dried on anhydrous sodium sulphate. After evaporation of the ether, 1.7 g. of volatile compound were obtained. After molecular distillation, there were obtained 1.52 g. of colorless liquid (compound IV), which represented a yield of 82%.

The infrared spectrum of this compound is characterized by the presence of an N—H band at 3300 cm.$^{-1}$.

To 1 g. of compound IV which was dissolved in 15 ml. of distilled water, there are added 10 mg. of phosphotungstic acid and 1.5 ml. of hydrogen peroxide at 110 volumes. After agitation for a period of 1½ hours, the solution is saturated with sodium chloride, then extracted by three portions of 50 ml. of ethyl ether. The ethereal solution was washed with a saturated sodium chloride solution, then dried on anhydrous sodium sulphate. After evaporation of the ether in a water bath, 800 mg. of compound V were thus obtained in the form of a badly crystallized red product.

Chromatographic processing of 242 g. of this compound on 250 g. of "Woehler" alumina having an activity of 3 has yielded 210 mg. of crystals which were eluted with the mixture of 95% pentane and 5% ether. After recrystallization in pentane, there were obtained 200 mg. of red crystals, namely a yield of 56%.

The infrared spectrum in the carbon tetrachloride is mainly characterized by the presence of a band at 1385 cm.$^{-1}$ which does not exist in the spectrum of the amine. The ultraviolet spectrum in cyclohexane shows the characteristic absorption of the nitroxide radicals at $$\lambda_{max.} = 482.5 \text{ m}\mu$$

(coefficient of specific absorption $\epsilon$ equal to 8.5).

These radicals which are stable in the solid state can react once they are in solution.

What we claim is:

1. A free radical of the nitroxide type selected from the group consisting of aza-9-bicyclo (3,3,1) nonanone-3-oxyl-9 and aza-9-bicyclo (3,3,1) nonane-oxyl-9.

References Cited

Aust J. Chem. 1967 vol. 20 p. 561.

HENRY R. JILES, Primary Examiner

S. D. WINTERS, Assistant Examiner